United States Patent [19]

Beyer

[11] Patent Number: 4,608,884
[45] Date of Patent: Sep. 2, 1986

[54] APPARATUS FOR DRIVING TWO AXES OF THE HAND ELEMENT OF AN INDUSTRIAL ROBOT

[75] Inventor: Hasso Beyer, Augsburg, Fed. Rep. of Germany

[73] Assignee: EKE Robotersysteme GmbH, Munich, Fed. Rep. of Germany

[21] Appl. No.: 518,258

[22] Filed: Jul. 28, 1983

[30] Foreign Application Priority Data

Aug. 3, 1982 [DE] Fed. Rep. of Germany ....... 3228945

[51] Int. Cl.⁴ .............................................. F16H 1/22
[52] U.S. Cl. ................................ 74/665 B; 74/665 M; 74/417; 901/29
[58] Field of Search ............ 74/665 M, 665 L, 665 A, 74/665 B, 665 D, 665 E, 661, 417; 414/4, 5, 6, 735; 901/26, 27, 29

[56] References Cited

U.S. PATENT DOCUMENTS

| | | | |
|---|---|---|---|
| 2,861,699 | 11/1958 | Youmans | 414/4 |
| 3,543,592 | 12/1970 | Haaker et al. | 901/29 X |
| 3,543,593 | 12/1970 | Haaker et al. | 901/29 X |
| 3,572,807 | 3/1971 | Haaker et al. | 901/29 X |
| 3,739,923 | 6/1973 | Totsuka | 414/735 |
| 3,922,930 | 12/1975 | Fletcher et al. | 901/27 X |
| 3,985,238 | 10/1976 | Nakura et al. | 74/417 X |
| 4,030,617 | 6/1977 | Richter | 414/4 |
| 4,068,536 | 1/1978 | Stackhouse | 74/417 |
| 4,367,998 | 1/1983 | Causer | 414/4 |
| 4,431,366 | 2/1984 | Inaba et al. | 414/4 X |
| 4,458,566 | 7/1984 | Tajima | 414/4 X |
| 4,489,624 | 12/1984 | Schaib et al. | 414/4 X |
| 4,496,278 | 1/1985 | Kaise | 414/735 |
| 4,499,790 | 2/1985 | Helms | 74/417 X |
| 4,507,046 | 3/1985 | Sugimoto et al. | 414/4 X |

FOREIGN PATENT DOCUMENTS 7801844 5/1978 Fed. Rep. of Germany .

Primary Examiner—Kenneth J. Dorner
Assistant Examiner—Dwight G. Diehl
Attorney, Agent, or Firm—Pollock, Vande Sande & Priddy

[57] ABSTRACT

An apparatus is disclosed for driving the two axes (11, 30) of the hand element of an industrial robot in which the casing (12) of the hand element is pivoted around the first axis while resting between two fork arms on the end of the boom (1, 10). Two reduction gears (19, 20) which can be separately driven are provided in the casing (12) and are arranged coaxially to the first axis, the reduction gears being arranged to drive coaxial bevel gears (24, 25) which, in their turn, are engaged with additional bevel gears (28, 29) supported by the casing (12) and extended at a right angle to the previous bevel gears (24, 25), the shaft of one of the bevel gears (28, 29) supporting a flange (31) which rotates around a second rotary axis (30) running at a right angle to the first axis (11).

16 Claims, 2 Drawing Figures

APPARATUS FOR DRIVING TWO AXES OF THE HAND ELEMENT OF AN INDUSTRIAL ROBOT

DESCRIPTION

1. Technical Field

The invention concerns an apparatus for driving two axes of the hand element of an industrial robot. The apparatus includes a casing positioned at the end of the boom of the robot. The casing can be rotated around a first axis running at a right angle to the boom axis. The casing supports a flange which can be rotated around a second axis running at a right angle to the first axis. As a result, two driving shafts can be run in the boom, each of which shafts drives a reduction gear by means of a bevel gear, the reduction gears being arranged in the casing and being effective upon rotation to cause rotation around the two axes.

2. Background Art

Such an apparatus is known, for example, from the German Utility Pat. No. 78 01 844. There, the apparatus is used in a so-called angle hand. Two driving shafts run coaxially in the boom and drive two shafts running coaxially towards each other, by means of one bevel gear each. One driving shaft is designed as a hollow shaft and drives the first reduction gear which rotates the casing. By means of a bevel gear, the other driving shaft drives a driven shaft arranged at a right angle to it. This driven shaft drives an additional reduction gear which in turn rotates a flange positioned coaxially with it.

This known apparatus is rather large and complicated. Its large size is due not only to the angular structure but also to the necessary size of the reduction gears, both of which are designed for the respective maximum carrying load. Since the second axis runs at a distance to the boom axis, there is a high load moment on the casing support.

DISCLOSURE OF THE INVENTION

An object of the present invention is to simplify the design and reduce the size of such an apparatus and yet provide an apparatus able to move high carrying loads. This objective is accomplished with the invention defined in the appended claims.

During use of an apparatus according to the present invention, a number of advantages are realized. High loads can be moved with a small and light construction since the angular momentums from both moving axes are distributed on two reduction gears by means of a differential gear. The boom axis extends in the plane within which the flange axis moves when the casing is pivoted. The flanged is arranged close to the rotary axis of the casing so that relatively low load moments act on its support. The device is structured symmetrically. An optimum lubrication is possible since the fast-running gear parts are located in the center of the device; thus, independent of the position of the symmetrical casing, an optimum oil level can be maintained with the device. The complexity of controlling such an apparatus is considerably reduced in comparison to the aforementioned prior art angle hand.

BRIEF DESCRIPTION OF THE DRAWINGS

An exemplified embodiment is further explained below with the help of the drawings in which.

BEST MODE FOR CARRYING OUT THE INVENTION

Figure 1:
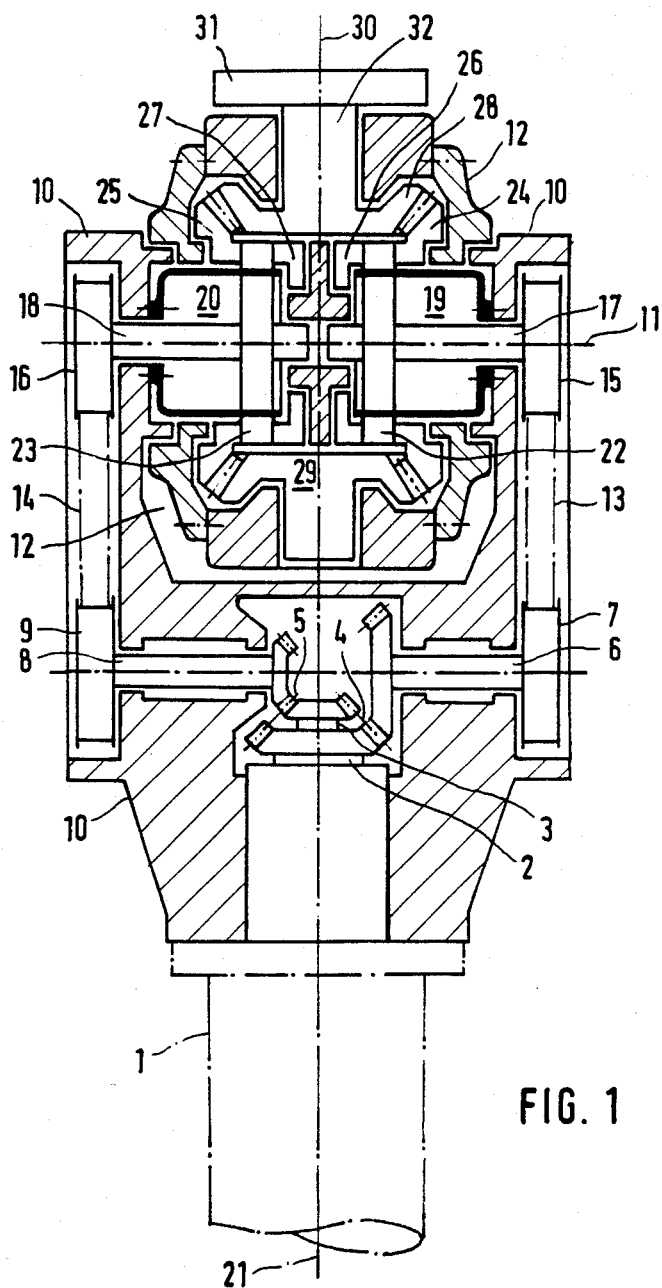
FIG. 1 shows a cross-section through the device.

A first hollow drive shaft 2 and a second drive shaft 3 extend coaxially through the boom 1 of the robot. By means of a first bevel gear pair 4, the hollow drive shaft 2 drives a shaft 6 which carries a belt pulley 7. By means of a second bevel gear pair 5, the drive shaft 3 drives an additional shaft 8 which carries a belt pulley 9. The two shafts 6,8 extend coaxially toward each other and are rotatably supported in a casing part 10 which is rigidly connected with the end of the boom 1.

Two gear belts 13, 14 extend, respectively, along the outer sides of casing part 10 from the belt pulleys 7, 9 to a further pair of belt pulleys 15, 16 which are attached to the input or primary shafts 17, 18 of a pair of reduction gears 19, 20. The primary shafts of the reduction gears are supported for rotation by the opposite arms of the fork-shaped outer end of casing part 10. The reduction gears can be so-called harmonic drive gears which have a reduction ratio of 1:80. The primary shafts 17, 18 of the reduction gears 19, 20 extend coaxially toward each other along an axis 11 and are arranged symmetrically to the axis 21 of the boom 1. The gear housings of the reduction gears 19, 20 are rigidly connected with the casing part 10 and support the internal parts, not illustrated, of the reduction gears.

A casing 12 is pivoted on the casing part 10 for rotation around the first axis 11. This casing 12 rotatably supports the inner ends of the shafts 17, 18. The power take-off parts 22, 23 of the reduction gears 19, 20, respectively, support bevel gears 24, 25 for rotation around the axis 11. The power take-off parts 22, 23 and the bevel gears 24, 25 are rotatably positioned in the casing 12 by means of bearing attachments 26, 27. The two bevel gears 24, 25 are engaged with two additional bevel gears 28, 29 which extend coaxially toward each other along a rotary axis 30 running at a right angle to the first rotary axis 11. Both bevel gears 28, 29 are rotatably supported in the casing 12. A flange 31 rotatably supported in the casing 12 is connected with the shaft 32 of the bevel gear 28.

Figure 2:
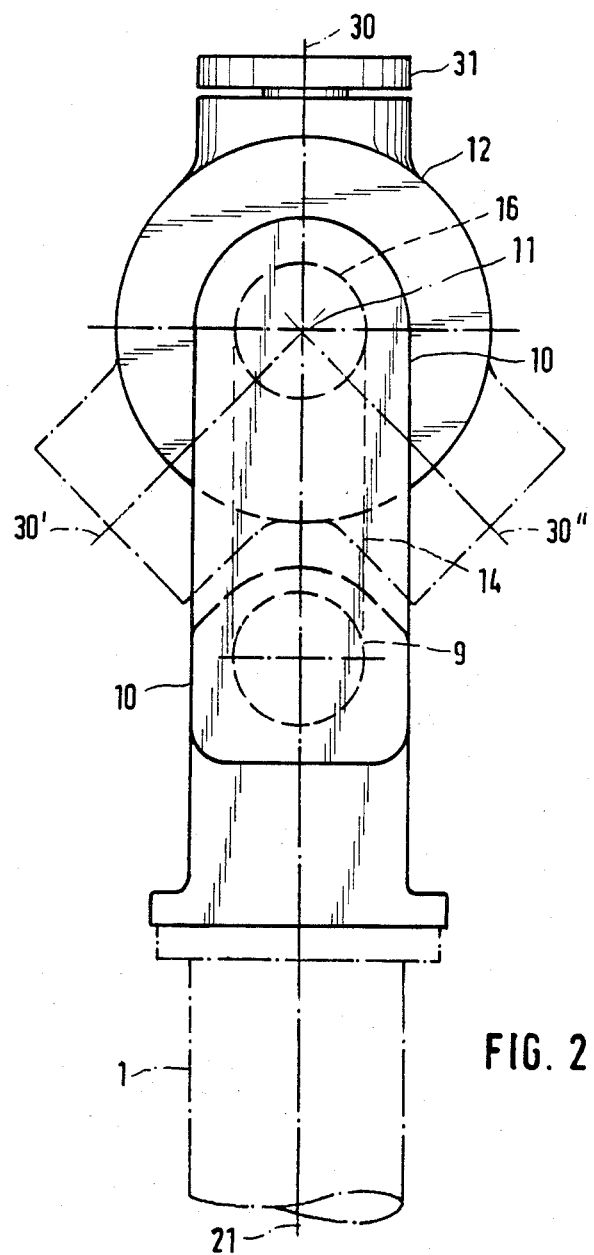
FIG. 2 shows a top view on the device taken from the left as seen in FIG. 1.

In operation, when the two bevel gears 24, 25 are rotated at the same speed but in opposite directions, then the flange 31 is rotated around its axis 30 while the casing 12 stands still. However, when the bevel gears 24, 25 are rotated at the same speed but in the same direction, then the casing 12 is rotated around the axis 11 while the flange 31 does not rotate around its axis 30. When the bevel gears 24, 25 turn in the same or opposite directions with different speeds, then the flange 31 rotates around its axis 30 while, at the same time, the casing 12 rotates around the axis 11. Since the reduction ratios are the same from the shaft 2 to the bevel gear 24 and from the shaft 3 to the bevel gear 25, the above described movements can be set by the same speeds of the shafts 2, 3 in the same or opposite directions, or by different speeds in the same or opposite directions when a superimposition of the rotary movements around the axes 11 and 30 is desired. No matter whether a rotary movement is effected around the axis 11 or a rotary movement around the axis 30, the angular momentum is always distributed to the two symmetrical gear trains. In FIG. 2, the swivel range of the casing 12 is shown in a broken line. The two extreme positions of the axis 30 are designated by 30' and 30".

Having described my invention in sufficient detail to enable those skilled in the art to make and use it, I claim:

1. In an apparatus for driving elements rotatable about a pair of axes of a hand element of an industrial robot of the type including a first casing positioned at the end of a boom of the robot, said first casing being adapted to be rotated around a first axis extending at a right angle to the boom axis, said first casing supporting a flange adapted to be rotated around a second axis extending at a right angel to the first axis; two driving shafts extending through the boom; and a pair of reduction gears driven by said driving shafts by means of respective bevel gears arranged in a second casing, rotation of the reduction gears causing rotation around the two axes, the improvement wherein:

said reduction gears are sealed within said first casing are located within the center thereof and include power take-off parts which are rotatably supported by said first casing and extend coaxially toward each other along said first axis, each of said power take-off parts supporting a further bevel gear;

said first casing is rotatably supported on the end of said boom for rotation around said first axis; and said further bevel gears are engaged with an additional bevel gear supported by said first casing for rotation about said second axis, said additional bevel gear being connected with said flange.

2. The apparatus according to claim 1, wherein said flange is arranged on the shaft of said additional bevel gear whose axis forms said second axis.

3. The apparatus according to claim 2, wherein said respective bevel gears drive first and second shafts supporting first and second belt pulleys, said first and second shafts extending coaxially toward each other; further comprising third and fourth belt pulleys, said third and fourth belt pulleys each being operatively associated with the input shaft of a respective one of said reduction gears; and a pair of gear belts, each of said gear belts extending between a respective pair of said first and second, third and fourth belt pulleys.

4. The apparatus according to claim 3, wherein said end of said boom comprises a fork-shaped part and said belt pulleys and said gear belts run along the outer sides of the arms of said fork-shaped part.

5. The apparatus according to claim 3, wherein said input shafts and said reduction gears are arranged coaxially to said first axis.

6. The apparatus according to claim 5, wherein said end of said boom comprises a fork-shaped part and said belt pulleys and said gear belts run along the outer sides of the arms of said fork-shaped part.

7. The apparatus according to claim 1, wherein said end of said boom comprises a fork-shaped part and said first casing is supported between the arms of said fork-shaped part.

8. The apparatus according to claim 7, wherein said respective bevel gears drive first and second shafts supporting first and second belt pulleys, said first and second shafts extending coaxially toward each other; further comprising third and fourth belt pulleys, said third and fourth belt pulleys being operatively associated with the input shaft of a respective one of said reduction gears; and a pair of gear belts, each of said gear belts extending between a respective pair of said first and second, and third and fourth belt pulleys.

9. The apparatus according to claim 8, wherein said end of said boom comprises a fork-shaped part and said belt pulleys and said gear belts run along the outer sides of the arms of said fork-shaped part.

10. The improved apparatus according to claim 8, wherein said input shafts and said reduction gears are arranged coaxially to said first axis.

11. The apparatus according to claim 10, wherein said end of said boom comprises a fork-shaped part and said belt pulleys and said gear belts run along the outer sides of the arms of said fork-shaped part.

12. The apparatus according to claim 1, wherein said respective bevel gears drive first and second shafts supporting first and second belt pulleys, said first and second shafts extending coaxially toward each other; further comprising third and fourth belt pulleys, said third and fourth belt pulleys being operatively associated with the input shaft of a respective one of said reduction gears; and a pair of gear belts, each of said gear belts extending between a respective pair of said first and second, and third and fourth belt pulleys.

13. The apparatus according to claim 12, wherein said end of said boom comprises a fork-shaped part and said belt pulleys and said gear belts run along the outer sides of the arms of said fork-shaped part.

14. The apparatus according to claim 12, wherein said input shafts and said reduction gears are arranged coaxially to said first axis.

15. The apparatus according to claim 14, wherein said end of said boom comprises a fork-shaped part and said belt pulleys and said gear belts run along the outer sides of the arms of said fork-shaped part.

16. The apparatus according to claim 1, wherein said power take-off parts and said further bevel gears are rotatably supported in said casing.

* * * * *